United States Patent [19]
Mehren et al.

[11] 4,436,170
[45] Mar. 13, 1984

[54] EXTERNALLY TRACK-GUIDED VEHICLE, ESPECIALLY FOR THE LOCAL PUBLIC PASSENGER TRAFFIC

[75] Inventors: Herbert Mehren, Ludwigsburg; Ferdinand Panik, Fellbach, both of Fed. Rep. of Germany

[73] Assignee: Daimler-Benz Aktiengesellschaft, Stuttgart, Fed. Rep. of Germany

[21] Appl. No.: 951,044

[22] Filed: Oct. 13, 1978

[30] Foreign Application Priority Data

Oct. 15, 1977 [DE] Fed. Rep. of Germany ....... 2746462

[51] Int. Cl.³ .............................................. B62D 1/26
[52] U.S. Cl. .................................... 180/131; 104/247; 280/776
[58] Field of Search ................... 180/131, 79; 280/776; 104/247, 245, 244.1

[56] References Cited

U.S. PATENT DOCUMENTS

| | | | |
|---|---|---|---|
| 745,855 | 12/1903 | Jackman | 104/247 |
| 1,748,309 | 2/1930 | Rose | 104/247 |
| 1,840,988 | 1/1932 | Traver | 104/247 |
| 3,796,165 | 3/1974 | Goode | 180/131 |
| 3,853,069 | 12/1974 | Goodwin | 104/245 |
| 4,057,019 | 11/1977 | Shaffer | 180/131 |

FOREIGN PATENT DOCUMENTS

| | | | |
|---|---|---|---|
| 2513453 | 10/1975 | Fed. Rep. of Germany | 180/131 |
| 2127088 | 6/1976 | Fed. Rep. of Germany | 180/131 |
| 2641637 | 3/1978 | Fed. Rep. of Germany | 104/247 |
| 2721071 | 11/1978 | Fed. Rep. of Germany | 104/247 |

*Primary Examiner*—David M. Mitchell
*Attorney, Agent, or Firm*—Craig & Burns

[57] ABSTRACT

An externally mechanically track-guided vehicle, especially for the public local passenger traffic, which is equipped with a vehicle axle having steerable wheels and with support arms arranged at the wheel hubs of the steerable wheels and extending forwardly in the driving direction on one side of a respective hub. Cross-guide rollers for automatically influencing the deflection angle of the steerable wheels are provided at the forward end of each support arm which are located in front of the steerable wheels, as viewed in the driving direction. The support arms are constructed as bending-rigid as possible under elimination of elasticities or yieldingnesses while the metallic cross-guide rollers are provided with a solid rubber tread.

21 Claims, 5 Drawing Figures

EXTERNALLY TRACK-GUIDED VEHICLE, ESPECIALLY FOR THE LOCAL PUBLIC PASSENGER TRAFFIC

The present invention relates to an externally track-guided vehicle, especially for the public local passenger traffic, with a steerable vehicle axle provided with deflectable (steerable) wheels and with support arms arranged at the wheel hubs of the deflectable wheels and extending forwardly in the driving direction on one side, whereby a cross-guide roller located in front of the corresponding wheel is provided for automatically influencing the deflection angle of the deflectable wheels.

Such a vehicle is known, for example, from the German Auslegeschrift No. 2,127,088.

With the cross-guided vehicles having cross-guide rollers arranged within the area of the steerable or deflectable wheels, which are pivotal in unison with the deflectable wheels, two systems that are totally different in principle have to be kept carefully apart. With the vehicles having support arms and cross-guide rollers unilaterally arranged in front of the deflectable wheels in the driving direction, to which the present invention relates, the force for the cross guidance of the vehicle is produced by the vehicle wheels themselves and the support arms and the cross-guide rollers are loaded or stressed exclusively by the steering forces. It thereby involves a control operation, in which according to the extent of the relative approach of the vehicle to a cross-guide web, the deflection angle is corrected in such a manner that the lateral distance of the vehicle from the cross-guide web is again guided in the direction toward the corresponding normal distance.

In contrast thereto, externally positively mechanically cross-guided buses are known, in which cross-guide rollers are arranged within the area of the deflectable wheels in front and to the rear of the vehicle wheels as viewed in the driving direction, which cross-guide rollers are connected with the hubs of the deflectable wheels by way of support arms. With this arrangement, the steerable wheel is always adjusted exactly parallel or tangentially to the cross-guide web; the vehicle wheels follow accurately the driving direction without oblique angle and they are therefore not in the position to absorb cross-guide forces to any significant extent. With the cross-guide rollers arranged in the driving direction in front and to the rear of the deflectable wheels, the cross-guide forces for the vehicle must therefore be produced by the cross-guide rollers and the support arms. It thereby does not involve a control operation but a positive mechanical roller guidance of the vehicle. In contrast to the cross-controlled track guidance with only one cross-guide roller, as described hereinabove, a mechanical guidance of the vehicle on both oppositely disposed vehicle sides is indispensable in that case as long as the vehicle is to be guided automatically. By a one-sided prestress of the cross-guide roller with cross-controlled vehicles, in contrast thereto, a track maintenance of the vehicle is possible also without difficulty with only a single cross-guide web.

The arrangement with only one cross-guide roller within the area of a deflectable vehicle wheel therefore distinguishes itself in principle from an arrangement with cross-guide rollers arranged in front and to the rear of the deflectable wheel. With the unilateral or one-sided arrangement of cross-guide rollers, certain questions and problems occur with respect to the characteristic or inherent dynamics of the control loop which is formed by the cross-guide web, the cross-guide roller with support arm, the pivotal vehicle hub, the wheel circumference and the road surface. Such a problem does not exist with a vehicle having cross-guide rollers arranged in front and to the rear of the vehicle wheels because in this case the wheel position is positively predetermined always by the configuration of the cross-guide web. This is a certain advantage of the arrangement of cross-guide rollers on both sides; however, it it disadvantageous in connection therewith that twice the number of cross-guide rollers and support arms have to be provided, which impairs the unsprung masses and therewith the spring comfort of the vehicle. With the cross-controlled vehicles having only a single guide roller per steerable vehicle wheel, the unsprung masses are smaller and the support arms and the cross-guide rollers are also relieved of cross-guide forces because the same can be taken over by the support wheels of the vehicle; however, this type of vehicle entails the disadvantage that the control system tends toward transverse vibrations above predetermined vehicle velocities which impair the driving comfort and the driving safety and which cut into the maximum permissible velocity of the vehicle.

It is the aim of the present invention to improve the aforementioned arrangement in such a manner that also higher driving velocities can be permitted without the excitation or occurrence of cross-guidance oscillations or vibrations.

The underlying problems are solved according to the present invention in that the support arms are constructed as bending-rigid as possible under elimination of elasticities or yieldingnesses and the metallic cross-guide rollers are provided with a solid rubber tread. Whereas heretofore one started with the belief that the cross-guide roller has to be supported at the wheel hub with a certain yieldingness, the present invention teaches in contradistinction thereto that not only the support of the cross-guide roller, but also the cross-guide roller itself must be constructed as hard as possible in order that also smallest cross-displacements of the vehicle inside of the cross-guide web lead immediately to corresponding angular changes of the deflectable wheels.

Accordingly, it is an object of the present invention to provide an externally mechanically track-guided vehicle, especially for the public local passenger traffic systems, which avoids by simple means the aforementioned shortcomings and drawbacks encountered in the prior art.

Another object of the present invention resides in an externally mechanically track-guided vehicle which requires relatively few parts for the guidance system, thereby reducing the unsprung masses and increasing the driving comfort of the vehicle.

A further object of the present invention resides in an externally mechanically track-guided vehicle, especially for the public local passenger traffic, which can be driven safely at relatively higher speeds.

Still a further object of the present invention resides in a vehicle of the type described above in which no cross-guidance oscillations occur even at relatively higher driving velocities.

These and other objects, features and advantages of the present invention will become more apparent from the following description when taken in connection with the accompanying drawings which shows, for purposes of illustration only, two embodiments in accordance with the present invention, and wherein.

Figure 4:
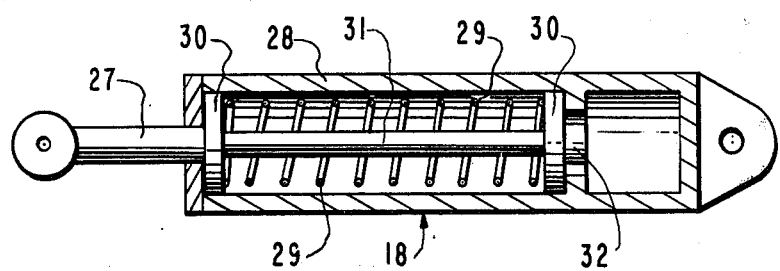
Figure 5:
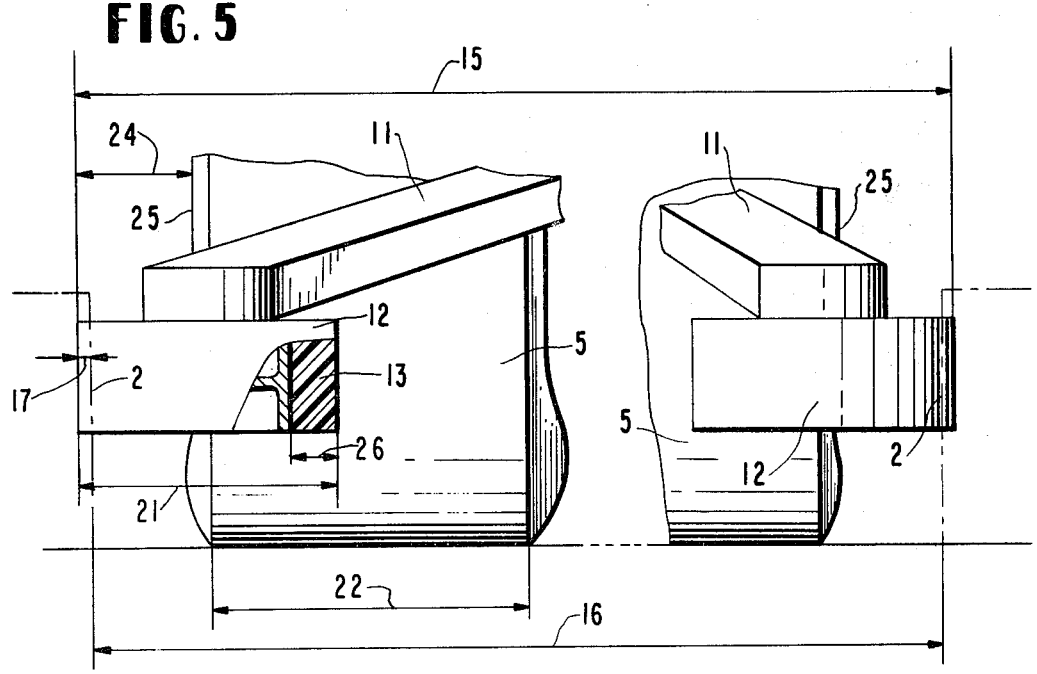

FIG. 4 is a somewhat schematic cross-sectional view through a modified embodiment of an element for the elastic middle centering of the support arm and of the cross-guide rollers in the straight driving direction according to the present invention; and FIG. 5 is a partial perspective view illustrating the dimensional conditions and relative positions of the cross-guide rollers in a system according to the present invention.

Figure 1:
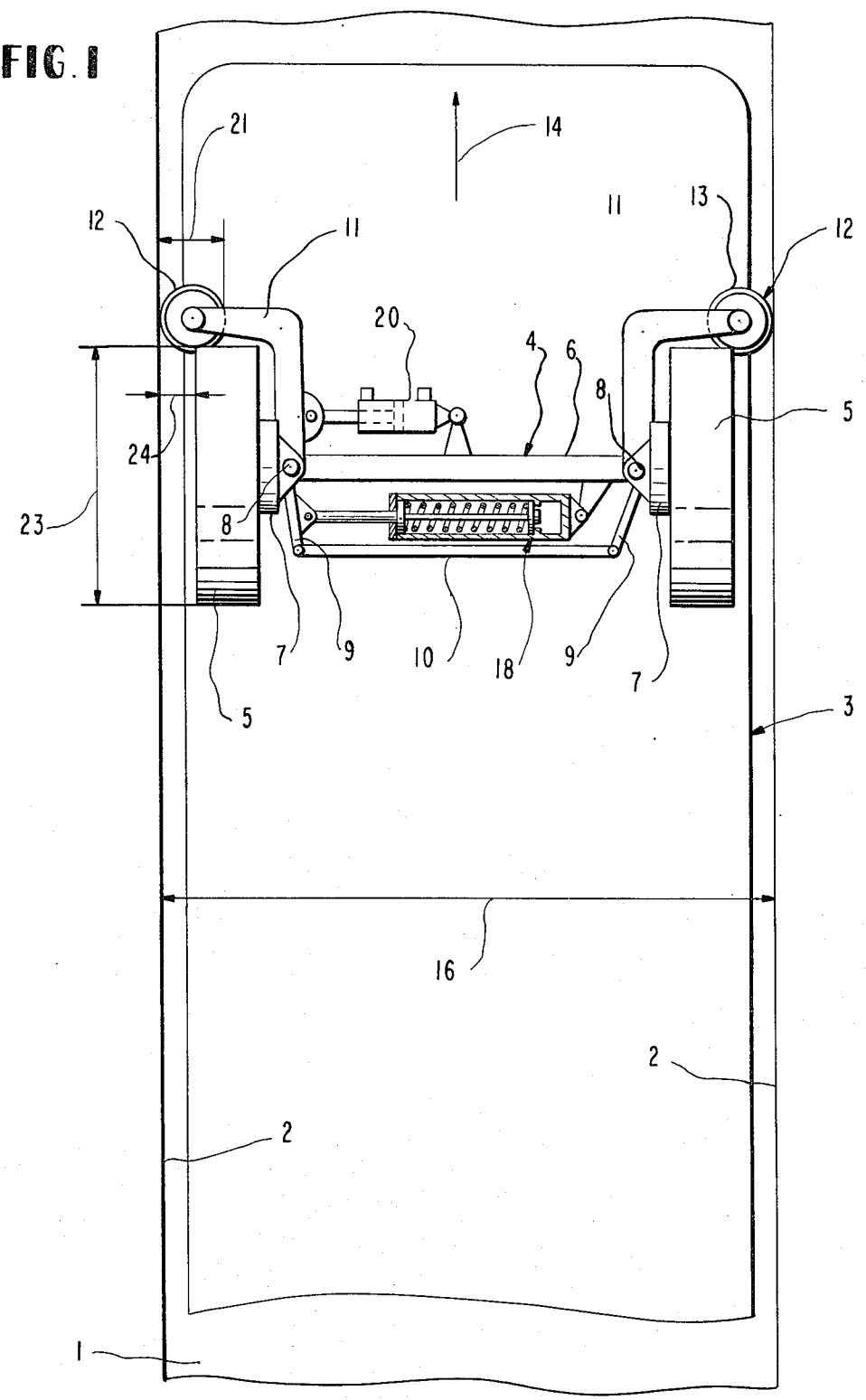
FIG. 1 is a schematic plan view on the front axle part of a cross-guided bus in accordance with the present invention.
Figure 2:
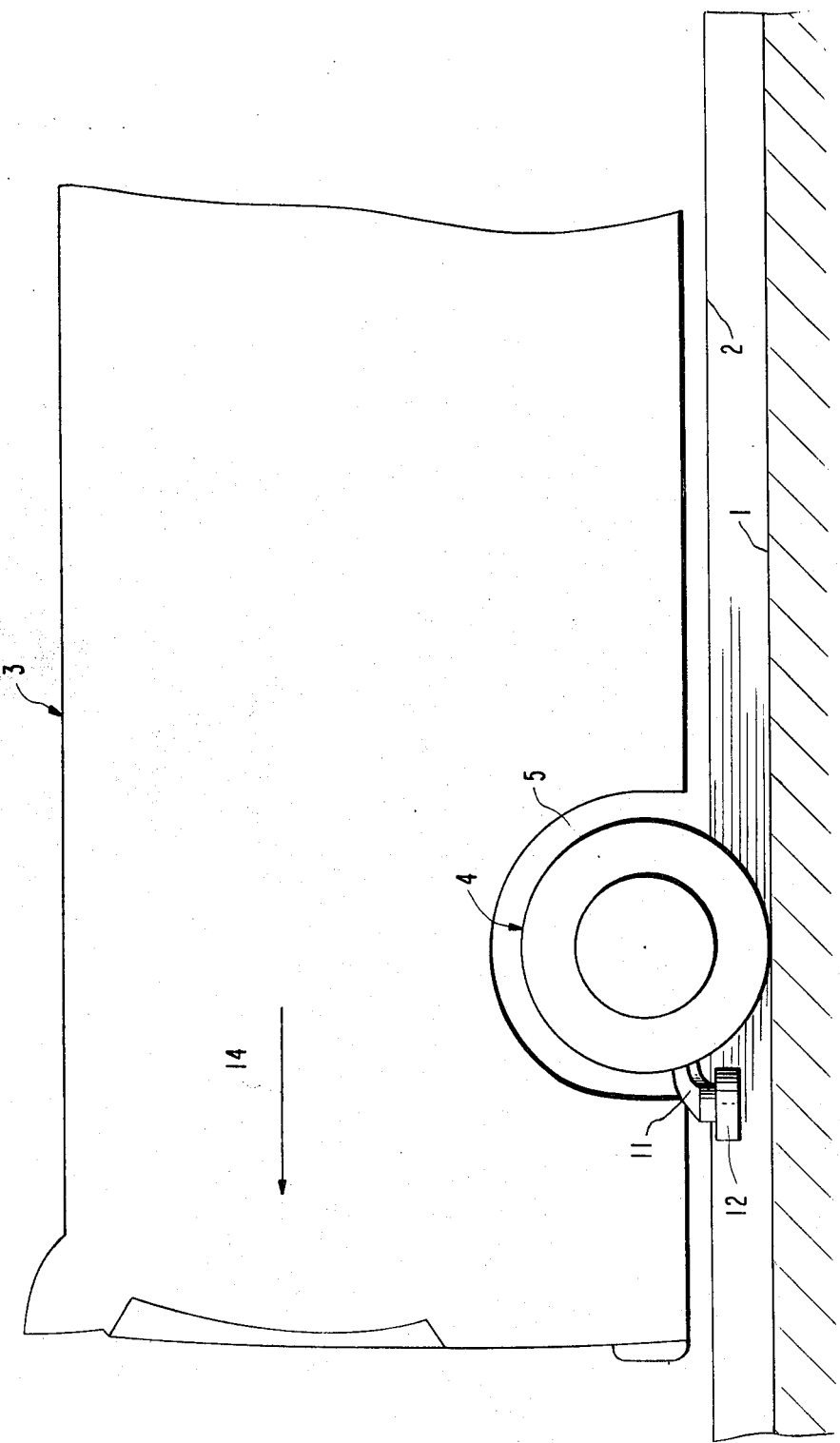
FIG. 2 is a partial side view of the vehicle of FIG. 1.

Referring now to the drawing wherein like reference numerals are used throughout the various views to designate like parts, the bus generally designated by reference numeral 3 which is illustrated in FIGS. 1 and 2, can travel tracklessly on normal roads and track-tied on a special road 1 having track-determining cross-guide webs 2 arranged laterally thereof. The steerable front axle generally designated by reference numeral 4 of the vehicle includes an axle carrier 6 with deflectable vehicle support wheels 5 pivotally connected thereon by way of pivot joints 8. Support arms 11, extending forwardly in the driving direction indicated by arrow 14, are arranged on the wheel hubs 7 and are deflectable together with the wheels 5. Cross guide rollers 12 are rotatably supported at the outer forward end of the support arms 11. The pivotal wheel hubs 7 of the oppositely disposed wheels are connected with each other by way of steering arms 9 and the track rod 10.

For avoiding cross-vibrations or oscillations at higher driving velocities, the angularly bent support arm 11 is constructed as bending-rigid as possible, whereby any elasticities and joint places are avoided. With the same aim, the cross-guide roller 12 is also constructed as metal wheel having a tread 13 of solid rubber. The radial thickness 26 (FIG. 5) of the tread 13 is kept relatively small in order that as hard a characteristic as possible of the cross-guide roller is achieved. The tread thickness amounts to about 10 to 20 percent of the roller diameter 21. The rubber hardness of the tread corresponds at least to the rubber hardness of the tire rubber of the vehicle support wheels 5.

The support arm 11 and the cross-guide roller 12 not only should be as hard as possible, but they should even abut at the cross-guide webs 2 under a certain prestress. The prestress amounts approximately to 400 to 1,000 N. This prestress can be achieved in that the external distance 15 (FIG. 5) of the cross-guide rollers 12 is kept slightly larger than the internal distance 16 of the cross-guide webs 2. A small oversize 17 results therefrom on both sides. When driving the bus 3 biasing a road with cross-guide webs 2, the support arms 11 and the cross-guide rollers 12 are then compressed inwardly on both sides by this oversize 17, whereby the aforementioned prestress results. With buses 3 as are customary for public local passenger traffic systems, the oversize 17 may amount on both sides to about 3 to 5 mm. Approximately 1 mm. of the oversize will thereby be attributable to the yieldingness of the support arm 11 and the remaining spring stroke of this oversize 17 will be traceable to a flattening of the cross-guide roller 12 at its solid rubber tread 13. The tread 13 has a progressively increasing spring characteristic so that with increasing steering force, the spring stroke becomes even smaller.

For achieving a bending-stiffness of the support arm 11, which is as large as possible, the construction principles known to a person skilled in the art will be used. It should be reminded once more at this place that the support arm 11 itself is loaded or stressed exclusively by the steering forces but not by the cross-guide forces for the vehicle. It is immaterial with the dimensioning of the support arm 11 that certain stresses are not exceeded, but it is important in connection therewith that the unavoidable spring deflection of the support arm 11 does not exceed a predetermined amount. Since the cross-guide roller 12 is loaded or stressed only by the steering forces, it may be constructed relatively small and relatively light-weight. This will not only benefit the magnitude of the unsprung mass and the spring comfort of the vehicle, but this will also have an advantageous effect on the space conditions and the accommodation possibilities of the cross-guide roller 12. The cross-guide roller 12 can be kept in its diameter 21 (FIG. 1) smaller than the width 22 of contact of the vehicle tire with the road surface. Starting with the diameter 23 (FIG. 1) of the vehicle support wheels 5, the cross-guide roller 12 may amount to approximately 15 to 20 percent of this diameter.

Owing to the good vibration-free guide properties of the roller support, the lateral projection 24 of the cross-guide rollers 12 (FIG. 1) beyond the outer edge 25 (FIG. 5) of the vehicle support wheels 5 has to be kept only very small. It may be limited to about 8 to 10 percent of the diameter of the vehicle support wheels 5. As a result thereof, the road width can be economized, which is particularly important for the system of the externally track-guided bus 3.

Figure 3:
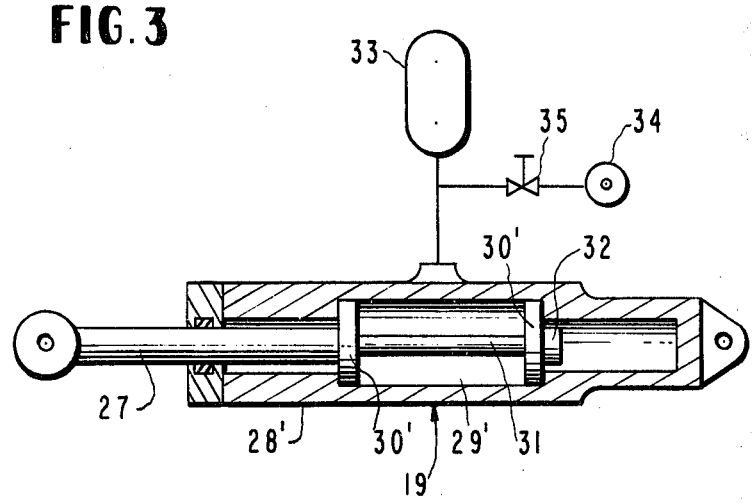
FIG. 3 is a somewhat schematic cross-sectional view through one embodiment of an element for the elastic middle centering of the support arm and of the cross-guide rollers in the straight driving direction according to the present invention.

As already mentioned, the cross-guidance of the instant type which is predicated on the principle of the cross-control, is able to get along with a one-sided guidance of the vehicle by means of only one single cross-guide web 2. Road vehicles with only one steered vehicle axle have the tendency in curves to deflect laterally toward the inside of the curve with the non-steered vehicle axle. With curves below a predetermined radius of curvature, the lateral displacement of the non-steered rear axle will be larger than the projection 24 of the cross-guide rollers 12. If one desires to drive through narrower curves, then a cross-guide web 2 must not be present in the curve area on the inside of the curve and, within this area, the vehicle must be guided unilaterally by the cross-guide roller 12 on the outside of the curve. In order that this is possible without any difficulty, the elastic middle centering of the support arms 11 and of the cross-guide rollers 12 in the straight driving direction is provided by the middle centering means generally designated by reference numeral 18 (FIG. 4) and 19 (FIG. 3). When driving through curves, the cross-guide roller 12 is displaced out of the straight driving position toward the vehicle center. The cross-guide roller 12 will be stressed toward the cross-guide web 2 on the outside of the curve by the middle centering means 18 or 19. As a result thereof, the cross-guide roller 12 follows the cross-guide web 2 also if the vehicle support wheel 5 on the outside of the curve should distance itself from the corresponding cross-guide web 3 beyond the normal extent.

Two embodiments for an element for the middle centering system are illustrated in FIGS. 3 and 4, of which one embodiment (FIG. 4) corresponds to that of FIG. 1 and includes an elastic spring 29 as decisive element whereas in contrast thereto, the device 19 according to FIG. 3 includes at a corresponding location a pressure space 29' which can be placed under pressure and can also be pressure-relieved hydropneumatically. The relieving ability of this middle centering device 19 according to FIG. 3 offers the advantage that with a trackless drive, no return forces can be exerted on the steerable vehicle support wheels 5 in the straight driving direction which might be disturbing and annoying for the vehicle driver.

The middle centering device 18 according to FIG. 4 is constructed as follows: Two abutments for spring plates 30 are provided in a spring housing 28 at predetermined distance. Both spring plates 30 are pressed against the abutments by the spring 29. A tie-rod 31 is mounted at a piston rod 27. The tie-rod 31 is thereby movably extended through both spring plates 30 and a tie-rod head 32 is mounted at the other end of the tie-rod 31. The spacing between the housing abutments for the spring plates 30 and the distance between the tie-rod head 32 and the shoulder formed by tie-rod 31 and the piston rod 27 are made exactly alike. By pushing the piston rod 27 into the housing 28, the spring 29 is compressed by the left spring plate 30 whereas the tie-rod 31 slides through the right spring plate 30. When pulling the piston rod 27 out of the housing 28, the spring 29 is compressed by the right spring plate 30 whereby the tie-rod 31 slides through the left spring plate 30. In both cases, the spring 29 has the tendency to seek the middle centering position illustrated in FIG. 4. This arrangement offers the advantage that the center position can be reproduced without hysteresis and accurately as regards position.

In the arrangement according to FIG. 3, corresponding parts are designated by the same reference numeral, respectively, with a primed reference numeral so that reference may be had to the preceding description for the same parts. The force of the spring 29 is produced in this embodiment by the pressure in the pressure space 29'. The plates 30' are constructed as flat pistons. The oil displaced out of the pressure space 29' reaches an expansion chamber 33 which imparts to the element its spring characteristic. With a track-tied drive, the expansion chamber 33 is filled from the pressure source 34 by way of the valve 35 and is stressed so that the middle centering system is effective. For trackless drives, the expansion chamber 33 is pressure-relieved by way of the valve 35 so that the middle centering system becomes inoperable.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A vehicle comprising a vehicle axle means including steerable vehicle wheels mounted thereon, cross-guide roller means being adapted to cooperate with an external guide track for mechanically guiding and automatically influencing a deflection angle of the steerable wheels, and support arm means for mounting said cross-guide roller means on at least one side of the vehicle, said cross-guide roller means being located at a forward end of the support arm means in front of the steerable vehicle wheel, as viewed in a normal driving direction of the vehicle, the support arm means is attached to the hub of each of the steerable vehicle wheels, the cross-guide roller means includes a single cross-guide roller, a single cross-guide roller is arranged on each of the support arm means so that a cross-guide roller means is provided on both sides of the vehicle forwardly of the steerable vehicle wheel, characterized in that the support arm means are constructed relatively bending-rigid under a substantial elimination of yieldingness, and in that the cross-guide roller is constructed as a metal wheel provided along an outer circumference thereof with a solid rubber tread, force storage means are interposed between the support arm means for prestressing the support arm means in a direction toward a position substantially corresponding to a straight driving position of the vehicle, a distance between outer surfaces of the cross-guide rollers is greater than a distance between cross-guide means of the external guide track so that the cross-guide rollers are adapted to be pressed against the cross-guide means under a prestress of about 400 to about 1,000 N.

2. A vehicle comprising a vehicle axle means including steerable vehicle wheels mounted thereon, cross-guide roller means being adapted to cooperate with an external guide track for mechanically guiding an automatically influencing a deflection angle of the steerable wheels, and support arm means for mounting said cross-guide roller means on at least one side of the vehicle, said cross-guide roller means being located at a forward end of the support arm means in front of the steerable vehicle wheel, as viewed in a normal driving direction of the vehicle, the support arm means is attached to the hub of the steerable vehicle wheels, the cross-guide roller means includes a single cross-guide roller, characterized in that the support arm means are constructed relatively bending-rigid under a substantial elimination of yieldingness, and in that the cross-guide roller is constructed as a metal wheel provided along an outer circumference thereof with a solid rubber tread, means are provided for selectively prestressing the support arm means in a direction of one of the two vehicle sides.

3. A vehicle comprising a vehicle axle means including steerable vehicle wheels mounted thereon, cross-guide roller means being adapted to cooperate with an external guide track for mechanically guiding and automatically influencing a deflection angle of the steerable wheels, and support arm means for mounting said cross-guide roller means on at least one side of the vehicle, said cross-guide roller means being located at a forward end of the support arm means in front of the steerable vehicle wheel, as viewed in a normal driving direction of the vehicle, the support arm means is attached to the hub of the steerable vehicle wheels, the cross-guide roller means includes a single cross-guide roller, characterized in that the support arm means are constructed relatively bending-rigid under a substantial elimination of yieldingness, and in that the cross-guide roller is constructed as a metal wheel provided along an outer circumference thereof with a solid rubber tread, a diameter of the cross-guide roller amounts to about 15 to about 20 percent of a diameter of a steerable vehicle wheel.

4. A vehicle according to claim 3, characterized in that the diameter of the cross-guide roller is smaller than a width of contact surface of the vehicle wheels with the road surface.

5. A vehicle comprising a vehicle axle means including steerable vehicle wheels mounted thereon, cross-guide roller means being adapted to cooperate with an external guide track for mechanically guiding and automatically influencing a deflection angle of the steerable wheels, and support arm means for mounting said cross-guide roller means on at least one side of the vehicle, said cross-guide roller means being located at a forward end of the support arm means in front of the steerable vehicle wheel, as viewed in a normal driving direction of the vehicle, the support arm means is attached to the hub of each of the steerable vehicle wheels, the cross-guide roller means includes a single cross-guide roller, a single cross-guide roller is arranged on each of the support arm means so that a cross-guide roller means is provided on both sides of the vehicle forwardly of the steerable vehicle wheel, characterized in that the support arm means are constructed relatively bending-rigid under a substantial elimination of yieldingness, and in that the cross-guide roller is constructed as a metal wheel provided along an outer circumference thereof with a solid rubber tread, force storage means are interposed between the support arm means for prestressing the support arm means in a direction toward a position substantially corresponding to a straight driving position of the vehicle, means are provided for prestressing the support arm means in a direction of one of the two vehicle sides.

6. A vehicle according to claim 5, characterized in that a cross-guide roller has a diameter which is equal to about 15 to about 20 percent of a diameter of a steerable vehicle wheel.

7. A vehicle according to claim 6, characterized in that the diameter of the cross-guide rollers is smaller than a width of a contact surface of the vehicle wheels with the road surface.

8. A vehicle according to claim 7, characterized in that each of the cross-guide rollers projects laterally beyond an outer edge of the vehicle wheels by a distance of about 8 to about 10 percent of the diameter of the steerable vehicle wheels.

9. A vehicle according to claim 8, characterized in that the solid rubber tread of the cross-guide roller amounts to about 10 to about 20 percent of the diameter of the cross-guide roller in the radial direction.

10. A vehicle according to claim 9, characterized in that the solid rubber tread has a rubber hardness corresponding at least approximately to a hardness of the rubber of the steerable wheels.

11. A vehicle according to claim 10, characterized in that the force storage means includes a mechanical spring means.

12. A vehicle comprising a vehicle axle means including steerable vehicle wheels mounted thereon, cross-guide roller means being adapted to cooperate with an external guide track for mechanically guiding and automatically influencing a deflection angle of the steerable wheels, and support arm means for mounting said cross-guide roller means on at least one side of the vehicle, said cross-guide roller means being located at a forward end of the support arm means in front of the steerable vehicle wheel, as viewed in a normal driving direction of the vehicle, the support arm means is attached to the hub of the steerable vehicle wheels, the cross-guide roller means includes a single cross-guide roller, characterized in that the support arm means are constructed relatively bending-rigid under a substantial elimination of yieldingness, and in that the cross-guide roller is constructed as a metal wheel provided along an outer circumference thereof with a solid rubber tread, the cross-guide roller means projects laterally beyond an outer edge of the steerable vehicle wheels by a distance of about 8 to about 10 percent of a diameter of the steerable vehicle wheels.

13. A vehicle comprising a vehicle axle means including steerable vehicle wheels mounted thereon, cross-guide roller means being adapted to cooperate with an external guide track for mechanically guiding and automatically influencing a deflection angle of the steerable wheels, and support arm means for mounting said cross-guide roller means on at least one side of the vehicle, said cross-guide roller means being located at a forward end of the support arm means in front of the steerable vehicle wheel, as viewed in a normal driving direction of the vehicle, the support arm means is attached to the hub of the steerable vehicle wheels, the cross-guide roller means includes a single cross-guide roller, characterized in that the support arm means are constructed relatively bending-rigid under a substantial elimination of yieldingness, and in that the cross-guide roller is constructed as a metal wheel provided along an outer circumference thereof with a solid rubber tread, the solid rubber tread of the cross-guide roller amounts to about 10 to about 20 percent of the diameter of the cross-guide roller in the radial direction.

14. A vehicle according to claim 13, characterized in that the solid rubber tread has a rubber hardness corresponding at least approximately to a hardness of the rubber of the steerable wheels.

15. A vehicle according to claim 13, characterized in that the cross-guide roller means projects laterally beyond an outer edge of the steerable vehicle wheels by a distance of about 8 to about 10 percent of a diameter of the steerable vehicle wheels.

16. A vehicle according to claim 1, characterized in that one support arm means is attached to the hub of each steerable vehicle wheel, a single cross-guide roller is arranged on each of the support arm means so that a cross-guide roller is provided on both sides of the vehicle forwardly of the steerable vehicle wheels, characterized in that an outer dimension of the cross-guide roller means in an unstressed free condition is larger than an inside dimension between cross-guide webs of the external guide track means.

17. A vehicle comprising a vehicle axle means including steerable vehicle wheels mounted thereon, cross-guide roller means being adapted to cooperate with an external guide track for mechanically guiding and automatically influencing a deflection angle of the steerable wheels, and support arm means for mounting said cross-guide roller means on at least one side of the vehicle, said cross-guide roller means being located at a forward end of the support arm means in front of the steerable vehicle wheel, as viewed in a normal driving direction of the vehicle, the support arm means is attached to the hub of each of the steerable vehicle wheels, the cross-guide roller means includes a single cross-guide roller, a single cross-guide roller is arranged on each of the support arm means so that a cross-guide roller means is provided on both sides of the vehicle forwardly of the steerable vehicle wheel, characterized in that the support arm means are constructed relatively bending-rigid under a substantial elimination of yieldingness, and in that the cross-guide roller is constructed as a metal wheel provided along an outer circumference thereof with a solid rubber tread, force storage means are interposed between the support arm means for prestressing the support arm means in a direction toward a position substantially corresponding to a straight driving position of the vehicle, the force storage mean includes a spring housing one end of which is connected to the vehicle axle means, a pair of spring plates disposed in said housing, the spring disposed between said pair of spring plates for normally urging the respective pair of spring plates against abutment means, a tie rod means extending through both of said pair of spring plates, and a piston rod means for connecting the tie rod means with one of the support arm means.

18. A vehicle comprising a vehicle axle means including steerable vehicle wheels mounted thereon, cross-guide roller means being adapted to cooperate with an external guide track for mechanically guiding and automatically influencing a deflection angle of the steerable wheel, and support arm means for mounting said cross-guide roller means on at least one side of the vehicle, said cross-guide roller means being located at a forward end of the support arm means in front of the steerable vehicle wheel, as viewed in a normal driving direction of the vehicle, characterized in that the support arm means is attached to the hub of the steerable vehicle wheels, the cross-guide roller means includes a single cross-guide roller, the support arm means are constructed relatively bending-rigid under a substantial elimination of yieldingness, and in that the cross-guide roller is constructed as a metal wheel provided along an outer circumference thereof with a solid rubber tread, one support arm means is attached to the hub of each steerable vehicle wheel, a single cross-guide roller is arranged on each of the support arm means so that a cross-guide roller means is provided on both sides of the vehicle forwardly of the steerable vehicle wheel, force storage means are interposed between the support arm means for biasing the support arm means in a direction toward a position substantially corresponding to a straight driving position of the vehicle, the force storage means includes a spring housing one end of which is connected to the vehicle axle means, a pair of spring plates disposed in said housing, the spring disposed between said pair of spring plates for normally urging the respective pair of spring plates against abutment means, a tie rod means extending through both of said pair of spring plates, and a piston rod means for connecting the tie rod means with one of the support arm means, and in that cross-guide rollers have a diameter which is equal to about 15 to about 20 percent of a diameter of a steerable vehicle wheel.

19. A vehicle comprising a vehicle axle means including steerable vehicle wheels mounted thereon, cross-guide roller means being adapted to cooperate with an external guide track for mechanically guiding and automatically influencing a deflection angle of the steerable wheels, and support arm means for mounting said cross-guide roller means on at least one side of the vehicle, said cross-guide roller means being located at a forward end of the support arm means in front of the steerable vehicle wheel, as viewed in a normal driving direction of the vehicle, characterized in that the support arm means is attached to the hub of the steerable vehicle wheels, the cross-guide roller means includes a single cross-guide roller, the support arm means are constructed relatively bending-rigid under a substantial elimination of yieldingness, and in that the cross-guide roller is constructed as a metal wheel provided along an outer circumference thereof with a solid rubber tread, one support arm means is attached to the hub of each steerable vehicle wheel, a single cross-guide roller is arranged on each of the support arm means so that a cross-guide roller means is provided on both sides of the vehicle forwardly of the steerable vehicle wheel, force storage means are interposed between the support arm means for biasing the support arm means in a direction toward a position substantially corresponding to a straight driving position of the vehicle, the force storage means includes a spring housing one end of which is connected to the vehicle axle means, a pair of spring plates disposed in said housing, the spring disposed between said pair of spring plates for normally urging the respective pair of spring plates against abutment means, a tie rod means extending through both of said pair of spring plates, and a piston rod means for connecting the tie rod means with one of the support arm means, that cross guide rollers have a diameter which is equal to about 15 to about 20 percent of a diameter of a steerable vehicle wheel, and in that the diameter of the cross-guide rollers is smaller than a width of a contact surface of the vehicle wheels with the road surface.

20. A vehicle comprising a vehicle axle means including steerable vehicle wheels mounted thereon, cross-guide roller means being adapted to cooperate with an external guide track for mechanically guiding and automatically influencing a deflection angle of the steerable wheels, and support arm means for mounting said cross-guide roller means on at least one side of the vehicle, said cross-guide roller means being located at a forward end of the support arm means in front of the steerable wheel, as viewed in a normal driving direction of the vehicle, characterized in that the support arm means is attached to the hub of the steerable vehicle wheels, the cross-guide roller means includes a single cross-guide roller, the support arm means are constructed relatively bending-rigid under a substantial elimination of yieldingness, and in that the cross-guide roller is constructed as a metal wheel provided along an outer circumference thereof with a solid rubber tread, one support arm means is attached to the hub of each steerable vehicle wheel, a single cross-guide roller is arranged on each of the support arm means so that a cross-guide roller means is provided on both sides of the vehicle forwardly of the steerable vehicle wheel, force storage means are interposed between the support arm means for biasing the support arm means in a direction toward a position substantially corresponding to a straight driving position of the vehicle, the force storage means includes a spring housing one end of which is connected to the vehicle axle means, a pair of spring plates disposed in said housing, the spring disposed between said pair of spring plates for normally urging the respective pair of spring plates against abutment means, a tire rod means extending through both of said pair of spring plates, and a piston rod means for connecting the tie rod means with one of the support arm means, cross-guide rollers have a diameter which is equal to about 15 to about 20 percent of a diameter of a steerable vehicle wheel, the diameter of the cross-guide rollers is smaller than a width of a contact surface of the vehicle wheels with the road surface, and in that each of the cross-guide rollers projects laterally beyond an outer edge of the vehicle wheels by a distance of about 8 to about 10 percent of the diameter of the steerable vehicle wheels.

21. A vehicle comprising a vehicle axle means including steerable vehicle wheel mounted thereon, cross-guide roller means being adapted to cooperate with an external guide track for mechanically guiding and automatically influencing a deflection angle of the steerable wheels, and support arm means for mounting said cross-guide roller means on at least one side of the vehicle, said cross-guide roller means being locates at a forward end of the support arm means in front of the steerable vehicle wheel, as viewed in a normal driving driving direction of the vehicle, characterized in that the support arm means is attached to the hub of the steerable vehicle wheel, the cross-guide roller means includes a single cross-guide roller, the support arm means are constructed relatively bending-rigid under a substantial elimination of yieldingness, and in that the cross-guide roller is constructed as a metal wheel provided along an outer circumference thereof with a solid rubber tread, one support arm means is attached to the hub of each steerable vehicle wheel, a single cross-guide roller is arranged on each of the support arm means so that a cross-guide roller means is provided on both sides of the vehicle forwardly of the steerable vehicle wheel, force storage means are interposed between the support arm means for biasing the support arm means in a direction toward a position substantiall corresponding to a straight driving position of the vehicle, the force storage means includes a spring housing one end of which is connected to the vehicle axle means, a pair of spring plates disposed in said housing, the spring disposed between said pair of spring plates for normally urging the respective pair of spring plates against abutment means, a tie rod means extending through both of said pair of spring plates, and a piston rod means for connecting the tie rod means with one of the support arm means, cross-guide rollers have a diameter which is equal to about 15 to about 20 percent of a diameter of a steerable vehicle wheel, the diameter of the cross-guide rollers is smaller than a width of a contact surface of the vehicle wheels with the road surface, each of the cross-guide rollers projects laterally beyond an outer edge of the vehicle wheels by a distance of about 8 to about 10 percent of the diameter of the steerable vehicle wheels, the solid rubber tread of the cross-guide roller amounts to about 10 to about 20 percent of the diameter of the cross-guide roller in the radial direction, and in that the solid rubber tread has a rubber hardness corresponding at least approximately to a hardness of the rubber of the steerable wheels.

* * * * *